United States Patent
Lindley et al.

(10) Patent No.: US 8,689,103 B2
(45) Date of Patent: Apr. 1, 2014

(54) AUTOMATED DIGITAL MEDIA PRESENTATIONS

(75) Inventors: Gregory Charles Lindley, Sunnyvale, CA (US); Timothy B. Martin, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1036 days.

(21) Appl. No.: 12/118,602

(22) Filed: May 9, 2008

(65) Prior Publication Data

US 2009/0282336 A1 Nov. 12, 2009

(51) Int. Cl.
*G06F 3/00* (2006.01)

(52) U.S. Cl.
USPC ............................ 715/726; 715/716; 715/730

(58) Field of Classification Search
USPC ......... 715/726, 723, 719, 720, 721, 722, 730, 715/731, 732, 716
See application file for complete search history.

(56) References Cited

U.S. PATENT DOCUMENTS

| | | | | |
|---|---|---|---|---|
| 5,937,136 A * | 8/1999 | Sato | | 386/288 |
| 7,752,548 B2 * | 7/2010 | Mercer | | 715/731 |
| 7,975,226 B2 * | 7/2011 | Blose et al. | | 715/726 |
| 2003/0210808 A1 * | 11/2003 | Chen et al. | | 382/118 |
| 2004/0061791 A1 * | 4/2004 | Terada | | 348/231.2 |
| 2004/0218894 A1 * | 11/2004 | Harville et al. | | 386/46 |
| 2005/0111824 A1 * | 5/2005 | Hunter et al. | | 386/52 |
| 2005/0192924 A1 * | 9/2005 | Drucker et al. | | 707/1 |
| 2006/0218522 A1 * | 9/2006 | Hanechak | | 717/105 |
| 2008/0309795 A1 * | 12/2008 | Mitsuhashi et al. | | 348/231.99 |
| 2008/0313214 A1 * | 12/2008 | Duhig et al. | | 707/102 |
| 2009/0232417 A1 * | 9/2009 | McMahan | | 382/309 |

* cited by examiner

*Primary Examiner* — Kieu Vu
*Assistant Examiner* — Blaine Basom
(74) *Attorney, Agent, or Firm* — Schwegman Lundberg & Woessner, P.A.

(57) ABSTRACT

Among other things, techniques and systems are disclosed for implementing an automated presentation of media content having associated metadata. The system provides an automated transition that corresponds to a relationship between a first media content item's metadata and metadata associated with a second media content item. The automated system also provides an automated information overlay that corresponds to a relationship between a first media content item's associated metadata and metadata associated with a second media content item. The automated system also can obtain information corresponding to metadata of the media content and provides automated information overlays while displaying the media content in a presentation.

75 Claims, 9 Drawing Sheets

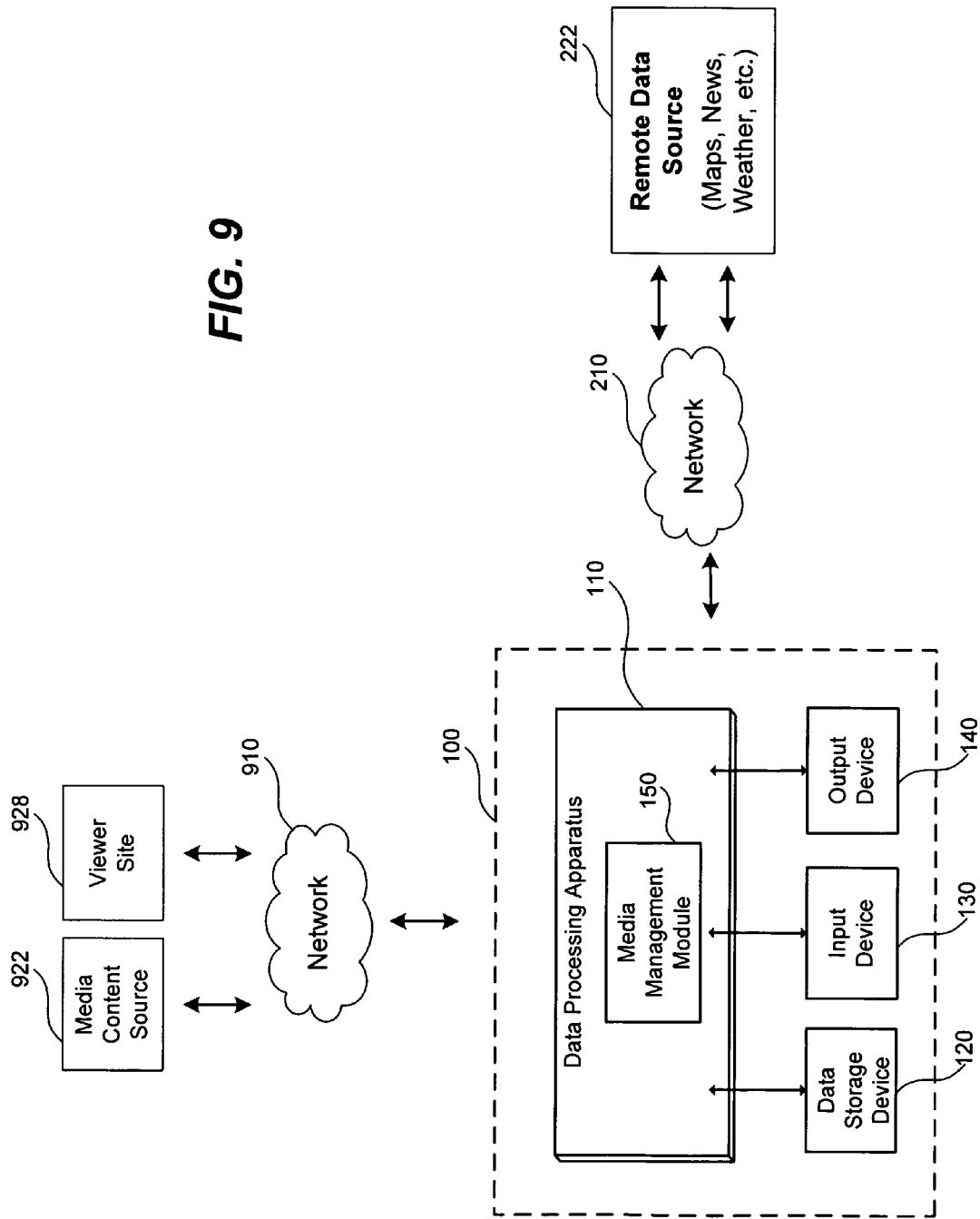

AUTOMATED DIGITAL MEDIA PRESENTATIONS

TECHNICAL FIELD

In general, this document describes systems and techniques for displaying electronic images such as digital or digitized photographs or video.

BACKGROUND

Digital photography and digital videography have simplified taking, viewing, storing, and reproducing media content such as still images and video. Photographs can be taken either using high-end equipment such as digital single lens reflex (SLR) cameras, low resolution cameras including point-and-shoot cameras and cellular telephone devices with suitable capabilities. In like manner, video can be taken either using high-end professional equipment, hand held cameras such as a camcorders, digital video cameras, and cellular telephone devices with suitable capabilities. Photographs and video can be transferred either individually as files or collectively as folders containing multiple files from the cameras to other media including computers, printers, and storage devices.

Software applications can be used to store, display, and edit digital media content obtained from a camera, video camera, or any other electronic image in a digital format. Such software applications provide a user in possession of a large repository of digital media content with the capabilities to organize, view, and edit photographs and video.

SUMMARY

Among other things, techniques and systems are disclosed for implementing a presentation of media content items with automated transitions and information overlays.

In one aspect, a computer-implemented method includes displaying a first media content item having associated metadata, displaying a transition corresponding to a relationship between the first media content item's metadata and metadata associated with a second media content item, and displaying the second media content item.

Implementations optionally include determining transitions for a media presentation including three or more media content items based on a relationship between metadata associated with the three or more media content items. Also, the method includes organizing three or more media content items having associated metadata for a media presentation based on a relationship between the associated metadata. Further, the method includes obtaining information corresponding to the relationship, and wherein displaying the transition further includes displaying the information. The information can also be obtained from a remote data source. Also, obtaining the information includes performing facial recognition of a person portrayed in the media content.

Other implementations include determining the relationship. Determining the relationship also includes calculating a difference between metadata associated with the first media content item and metadata associated with the second media content item. Additionally, the first media content item's associated metadata includes location information, the second media content item's associated metadata includes location information, and the relationship includes a change in location. The transition includes displaying the change in location on a map.

In other implementations, the first media content item's associated metadata includes time metadata, the second media content item's associated metadata includes time metadata, and the relationship includes a change in time. The transition includes displaying the elapsed time between the time metadata of the first media content item and the time metadata of the second media content item.

In other implementations of the method, the transition further includes displaying an animation. The transition includes displaying a change in event.

In another aspect, a computer program product, embodied on a computer-readable medium, operable to cause a data processing apparatus to perform operations includes displaying a first media content item having associated metadata, displaying a transition corresponding to a relationship between the first media content item's metadata and metadata associated with a second media content item, and displaying the second media content item. The operations also include determining transitions for a media presentation including three or more media content items based on a relationship between metadata associated with the three or more media content items. Also, operations include organizing three or more media content items having associated metadata in a media presentation based on a relationship between the associated metadata. Further, operations include obtaining information corresponding to the relationship, and wherein displaying the transition further includes displaying the information.

In other implementations of the computer program product, the information is obtained from a remote data source. Obtaining the information includes performing facial recognition of a person portrayed in the media content. Also, the operations include determining the relationship. The determining the relationship includes calculating a difference between metadata associated with the first media content item and metadata associated with the second media content item.

In other implementations of the computer program product, the transition includes displaying a change in location on a map. The transition includes displaying the elapsed time between time metadata associated with the first media content item and time metadata associated the second media content item. The transition further includes displaying an animation. The transition also includes displaying a change in event.

In another aspect, a system includes a processor, and a computer-readable medium encoding a computer program product to cause the processor to perform operations including displaying a first media content item having associated metadata, displaying a transition corresponding to a relationship between the first media content item's metadata and metadata associated with a second media content item, and displaying the second media content item. The operations further include determining transitions for a media presentation including three or more media content items based on a relationship between metadata associated with the three or more media content items. The operations further include organizing three or more media content items having associated metadata in a media presentation based on a relationship between the associated metadata. The operations also include obtaining information corresponding to the relationship, and wherein displaying the transition further includes displaying the information.

In another implementation of the system the information is obtained from a remote data source. Also, the obtaining the information includes performing facial recognition of a person portrayed in the media content. Further, the operations include determining the relationship. Additionally, the determining the relationship includes calculating a difference between metadata associated with the first media content item and metadata associated with the second media content item.

In another implementation of the system, the first media content item's associated metadata includes location information, the second media content item's associated metadata includes location information, and the relationship includes a change in location. Also, the transition includes displaying the change in location on a map. Additionally, the first media content item's associated metadata includes time metadata, the second media content item's associated metadata includes time metadata, and the relationship includes a change in time. Also, the transition includes displaying the elapsed time between the time metadata of the first media content item and the time metadata of the second media content item. The transition further includes displaying an animation. The transition further includes displaying a change in event.

In another aspect, a computer-implemented method includes displaying a presentation of media content having associated metadata, obtaining information corresponding to the media content's associated metadata, and displaying both the media content and the obtained information corresponding to the media content's associated metadata. The method further includes determining information to be displayed in the presentation based on relationships between metadata associated with three or more media content items in the presentation. The method further includes organizing three or more media content items having associated metadata for a media presentation based on a relationship between the associated metadata.

In other implementations of the method, the obtaining the information includes obtaining information from a remote data source. The obtaining the information includes performing facial recognition of a person portrayed in the media content. Also, the information includes news information. Further, the information includes sound. also, the information includes personal identification information of a person portrayed in the media content. The relationship information compromises familial relationship of a person portrayed in the media content with another person. The metadata includes event metadata. Also, the metadata includes topical metadata. Also, the metadata includes time metadata. Also, the metadata includes location metadata. The method further includes displaying a transition after the media content and before subsequent media content.

In another aspect, a computer program product, embodied on a computer-readable medium, operable to cause a data processing apparatus to perform operations includes displaying a presentation of media content having associated metadata, obtaining information corresponding to the media content's associated metadata, and displaying both the media content and the obtained information corresponding to the media content's associated metadata. Also, the operations include determining information to be displayed in the presentation based on relationships between metadata associated with three or more media content items in the presentation. The computer program product is also operable to cause a data processing apparatus to perform operations including organizing three or more media content items having associated metadata for a media presentation based on a relationship between the associated metadata.

In other implementations of the computer program product, the obtaining the information includes obtaining information from a remote data source. The obtaining the information includes performing facial recognition of a person portrayed in the media content. The information includes news information. Also, the information includes sound. Additionally, the information includes personal identification information of a person portrayed in the media content. The metadata includes event metadata. Also, the metadata includes topical metadata. Also, the metadata includes time metadata. Also, the metadata includes location metadata.

In another aspect, a system includes a processor; and a computer-readable medium encoding a computer program product to cause the processor to perform operations including displaying a presentation of media content having associated metadata, obtaining information corresponding to the media content's associated metadata, and displaying both the media content and the obtained information corresponding to the media content's associated metadata. Also, the operations further include determining information to be displayed in the presentation based on relationships between metadata associated with three or more media content items in the presentation. The system further includes organizing three or more media content items having associated metadata for a media presentation based on a relationship between the associated metadata.

In other implementations of the system, the obtaining the information includes obtaining information from a remote data source. The obtaining the information includes performing facial recognition of a person portrayed in the media content. The information includes news information. The information includes sound. The information includes personal identification information of a person portrayed in the media content. Additionally, the metadata includes event metadata. Also, the metadata includes topical metadata. Also, the metadata includes time metadata. Also, the metadata includes location metadata.

In another aspect, a computer-implemented method includes displaying a first media content item having associated metadata, and displaying both the media content item and an information overlay corresponding to a relationship between the first media content item's associated metadata and metadata associated with a second media content item. The method further includes determining information overlays for a media presentation includes three or more media content items based on a relationship between metadata associated with the three or more media content items. The method further includes organizing three or more media content items having associated metadata for a media presentation based on a relationship between the associated metadata. The method further includes determining the relationship. The method further includes obtaining information corresponding to the relationship, and wherein the displaying the information overlay further includes displaying the information.

In other implementations of the method, the information is obtained from a remote data source. Also, the first media content item's associated metadata includes location metadata and the second media content item's associated metadata includes similar location metadata; and displaying the information overlay includes depicting the similar location. Also, the first media content item's associated metadata includes event metadata and the second media content item's associated metadata includes the same event metadata; and displaying the information overlay includes depicting the event.

In other implementations of the method, the information overlay includes time information. The information overlay includes sound. The information overlay includes personal identification information.

In another aspect, a computer program product, embodied on a computer-readable medium, operable to cause a data processing apparatus to perform operations includes displaying a first media content item having associated metadata, and displaying both the media content item and an information overlay corresponding to a relationship between the first media content item's associated metadata and metadata associated with a second media content item. The operations include determining information overlays for a media presentation includes three or more media content items based on a relationship between metadata associated with the three or more media content items. The operations include organizing three or more media content items having associated metadata for a media presentation based on a relationship between the associated metadata. Additionally, the computer program product is further operable to cause a data processing apparatus to perform operations includes determining the relationship. The computer program product is further operable to cause a data processing apparatus to perform operations including obtaining information corresponding to the relationship, and wherein the displaying the information overlay further includes displaying the information.

In other implementations of the computer program product, the information is obtained from a remote data source. Also, the first media content item's associated metadata includes location metadata and the second media content item's associated metadata includes similar location metadata, and displaying the information overlay includes depicting the similar location. Additionally, the first media content item's associated metadata includes event metadata and the second media content item's associated metadata includes the same event metadata, and displaying the information overlay includes depicting the event.

In other implementations of the computer program product, the information overlay includes time information. The information overlay includes sound. The information overlay includes personal identification information.

In other implementations, a system includes a processor; and a computer-readable medium encoding a computer program product to cause the processor to perform operations including displaying a first media content item having associated metadata, and displaying both the media content item and an information overlay corresponding to a relationship between the first media content item's associated metadata and metadata associated with a second media content item. The operations further include determining information overlays for a media presentation includes three or more media content items based on a relationship between metadata associated with the three or more media content items. The operations further include organizing three or more media content items having associated metadata for a media presentation based on a relationship between the associated metadata. The operations further include determining the relationship. The operations further include obtaining information corresponding to the relationship, and the displaying the information overlay further includes displaying the information.

In other implementations of the system, the information is obtained from a remote data source. Also, the first media content item's associated metadata includes location metadata and the second media content item's associated metadata includes similar location metadata, and displaying the information overlay includes depicting the similar location. Also, the first media content item's associated metadata includes event metadata and the second media content item's associated metadata includes the same event metadata, and displaying the information overlay includes depicting the event.

In other implementations, the information overlay includes time information. The information overlay includes sound. Also, the information overlay includes personal identification information.

The details of one or more implementations are set forth in the accompanying drawings and the description below. Other features, aspects, and advantages will be apparent from the description and drawings, and from the claims.

DESCRIPTION OF DRAWINGS

FIG. 9 is a schematic of an example of a system for implementing a presentation.

Like reference symbols in the various drawings indicate like elements.

DETAILED DESCRIPTION

Techniques and systems are disclosed for implementing a presentation of media content items with automated transitions and information overlays.

Figure 1:
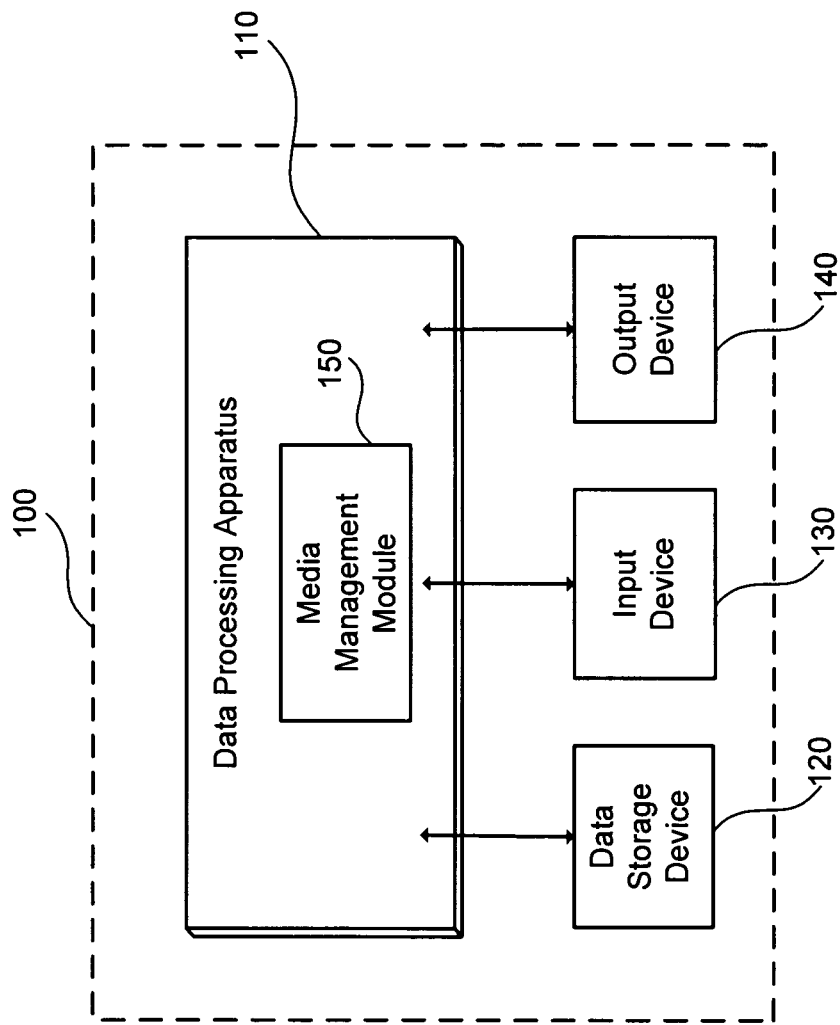
FIGS. 1 and 2 show examples of a system for implementing a presentation.

FIG. 1 is a schematic of an example of a system 100 for implementing a presentation. The system 100 includes a data processing apparatus 110 communicatively connected to a data storage device 120, an input device 130, and an output device 140. The data processing apparatus 110 also includes a media management module 150 used for managing media content items. A user can upload media content items via the input device 130. The media content items can then be stored in the data storage device 120.

The media content items may include, for example, digital video segments and/or digital photographs. In addition, a media content item can also include any electronic image regardless of how it was generated, e.g., a video cartoon, animation, CAD drawing, a scanned photograph, scanned hand drawing, and the like.

The media content items have associated metadata. Metadata can include various types of information, such as time metadata, location metadata, personal identification metadata, topic metadata, event metadata, and media content item type metadata. The metadata can also include comment metadata and ranking metadata. The associated metadata can be created automatically by the device creating the content. In another example, metadata can be input automatically after the media content has been created, for example, by the media management module 150. Or a user can input metadata, for example, by the input device 130.

For example, time metadata, the time of day and date of the media content, can be created by a digital device with an internal clock or GPS device when the media content item is created. In like manner, the location metadata can be obtained automatically by a digital device with an internal GPS unit when the media content item is created. In another example, the location metadata can be provided by a user, using a map-based user interface. Also, the personal identification metadata can be determined by a face-recognition program or software. The media management module can be configured with facial recognition capability and can automatically generate such metadata when media content items are uploaded by a user. The personal identification metadata can be linked to the media content item itself or directly to the person portrayed in the media content item.

Event metadata can include a description of what is occurring in the media content item. For example, a series of photographs and videos may have a similar event such as a particular trip, birthday party, sporting event, or the like. Event metadata can also be divided into global events and sub-events. For example, a global event could be a multi-day trip, for example, to Hawaii. A sub-event could be, for example, a several hour beach outing to Waimea bay during the Hawaii trip. In another example, the user can input information regarding the date, time span, and location of specific events or sub-events. The media management module can then automatically determine, based on time and/or location metadata, the event and/or sub-event metadata for the individual media content items.

In another example, a user can rank media content items. One ranking system can include ranking based on quality of the media content item. In another example, the user can rank or tag items as highlights. The user might have extensive content from a particular event; highlight metadata tags for media content items that are representative of the event can help facilitate organization and selection of media content items for a presentation. A user may also add comments that are incorporated as metadata to the media content item.

The data processing apparatus 110 processes the user input received through the input device and the processed input is mapped to one or more functions associated with implementing an automated presentation of the media content items, such as automated presentation creation and automated presentation display. The associated automated presentation functions can include media content item storage, media content item selection, media content item arrangement, transition creation, and information overlay creation etc. In addition, the media management module 110 can provide a graphical user interface (GUI) via the output device to enable a user to add metadata, manage media content items, select categories for presentations, and view automated presentations.

Figure 2:
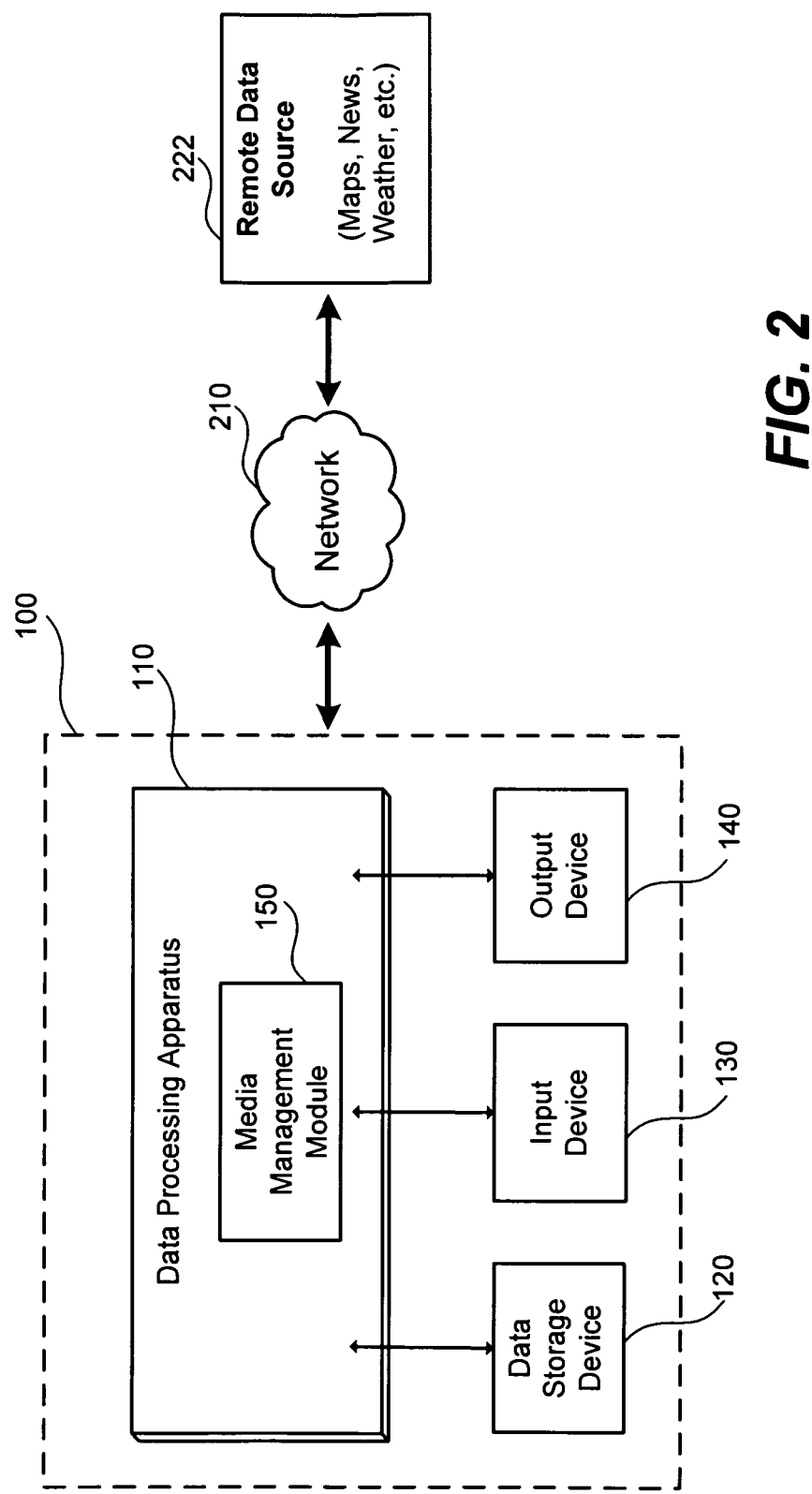

FIG. 2 is a schematic of another example of a system for implementing a presentation. FIG. 2 shows the system 100 communicatively connected a remote data source 222 via a communications network 210. The remote data source can be for example an RSS feed, applet source, flash movie source, a web based database such as weather database or a news database, a map generating service, sound effects provider, a music source, stock information database, album artwork source, etc. The media management module can obtain information related to the metadata of media content items from the remote data source. For example, the media management module can obtain weather information based on the time and location metadata for a particular media content item. In another example, the media management module can obtain news feed information based on the time metadata. The news feed information can also be location specific based on the location metadata. In yet another example, sound effects can be downloaded that relate to the metadata of a media content item.

Figure 3:
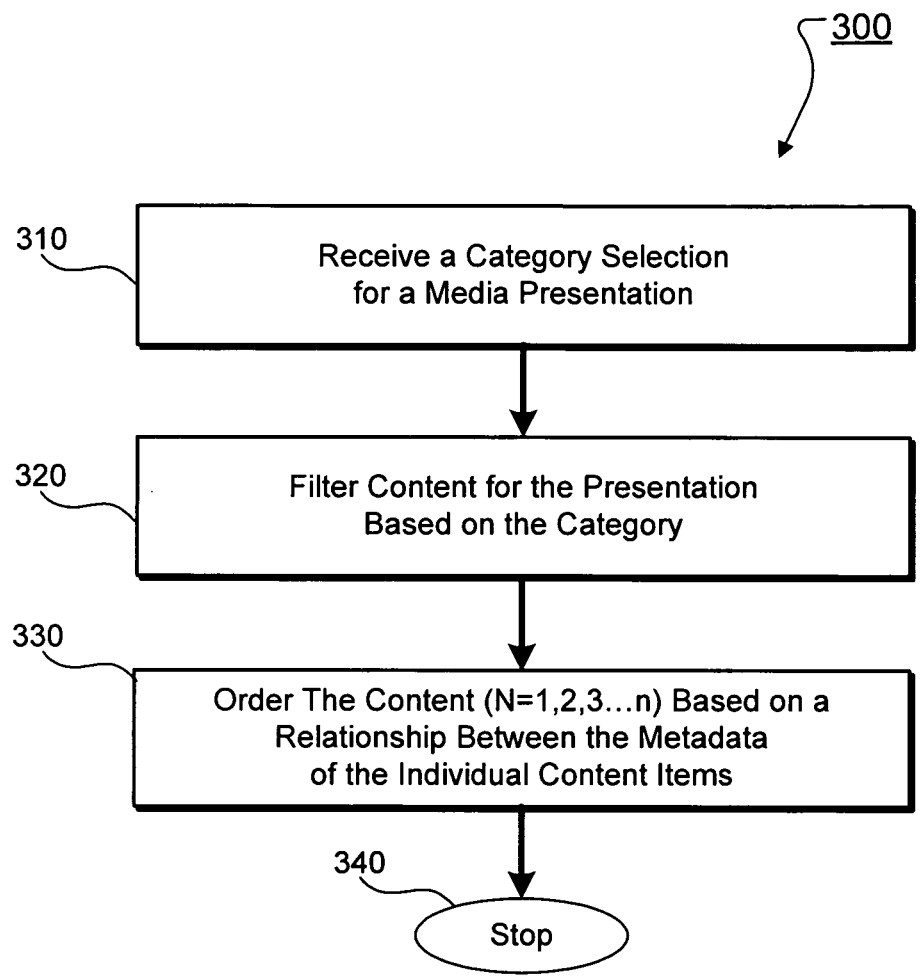
FIG. 3 is a flow chart illustrating a process for ordering of media content items for a presentation.

FIG. 3 is a flow chart illustrating a process 300 for ordering of media content items for a presentation. At 310, the process 300 receives a category selection for a media presentation. A user, for example, is presented with and can select various categories based on the metadata. The categories can include, for example, highlights from a recent trip, a person or persons, a location, an album, a particular event, a time period, an event or group of events, etc.

At 320, the process 300 filters media content items for the presentation based on a category or categories. In another example, the categories are provided by the automated system. The media content items whose metadata sufficiently match the selected category or categories are selected by the media management module for the presentation. For example, if the category is "highlights from a Hawaii trip," the process 300 selects media content items that have event metadata matching the Hawaii trip and that have a "highlight" metadata tag. In another implementation, the process selects high ranked content items that have metadata associated with the time and location of the Hawaii trip.

At 330, the process 300 then orders the content items (N=1, 2, 3, . . . n) based on a relationship between the metadata of each content item selected for the presentation where n is the number of content items in the presentation. The media content items can be ordered based on relationships between the metadata of the media content items. In another example, the process 300 can determine patterns in the relationships of between the metadata of the media content items and order the media content items according to those the patterns. Ordering the media content items can include grouping the items based on the relationships and/or patterns. In one implementation, the order can be chronological so that content item N=1 is the earliest created media content item and media content item N=n is the media content item created last. In another implementation, the order can be based on location. The process 300 orders the media content items with those closest to a starting location first and those furthest from the starting location last, regardless of when the media content item was created. In another example, order can also be based on ranking. Also, the order can be based any other relationship or combination of relationships.

The process also can present the user with various choices on how to order or group the media content items based on the patterns. In another example, the user can manually select media content items and manually determine the order in which they will be presented.

Figure 4:
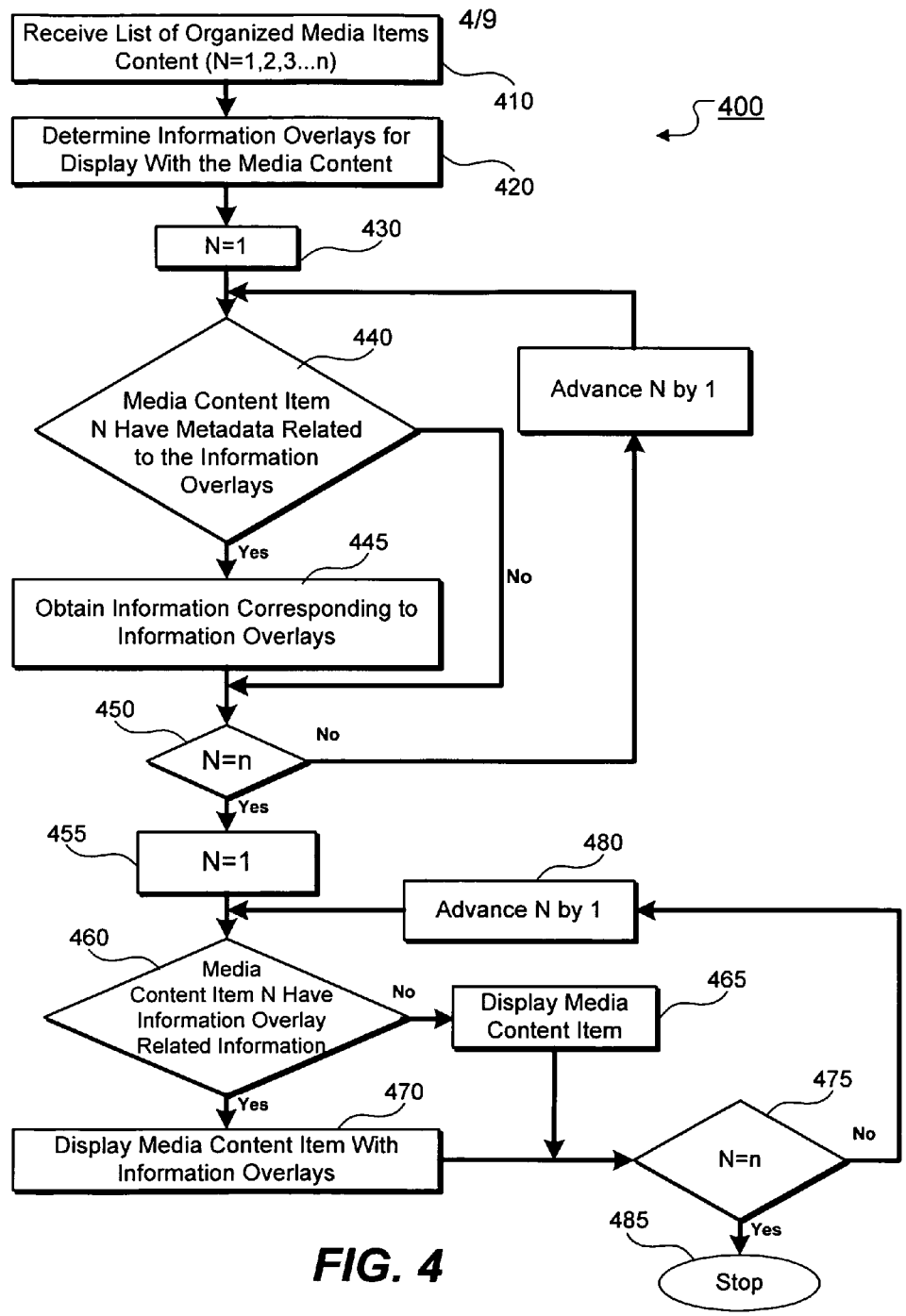
FIG. 4 is a flow chart illustrating a process for implementing a presentation with information overlays.

FIG. 4 is a flow chart illustrating a process 400 for implementing a presentation with information overlays. There are various types of information overlays. For example, an information overlay can be printed data, animation, music, sound effects, artwork, video content, illustration, etc. that overlays the media content item of a presentation.

At 410, the process 400 receives a list of media content items to be included in the media presentation. The media content items are organized from N=1, 2, 3 . . . n, where n is the number of media content items to be displayed in the presentation. The organization of the media content items can be based on the metadata. For example, the media content items can be organized as described in connection with FIG. 3.

At 420, the process 400 determines what kind of information overlays are to be displayed with the media content items as part of the presentation. This can be based on user input. For example, a user can be presented with a list of types of information overlays that can be displayed based on the metadata. The user then selects which types of information overlays are to be displayed as part of the presentation. In another example, the process 400 automatically determines which information overlays to display based on predetermined criteria such as the type of presentation, the type of metadata available, or the type of user viewing the presentation.

In another implementation, process 400, at 420, determines information overlays based on the relationships of the media content items in the presentation. For example, the process 400 determines what types of relationships and/or patterns in relationships exist between the media content items. The media content items for the presentation may already be organized according to some of these patterns and/or relationships as discussed in connection with FIG. 3. The process 400 recognizes like relationships and determines information overlays for those media content items. For example, media content items from the same event can be designated to have information overlays describing the event. In another example, a group of media content items in a presentation may be from one location whereas another group of media content items may be from another locations. The process 400 determines that location information overlays will be displayed for media content items of the same location. Also, the process 400 recognizes patterns in the relationships and determines information overlays for those media content items depicting such pattern in relationship. For example, the media content items in the presentation may span three consecutive days. In such an example, the media content items from the first day, second day, and third day are designated to have an information overlay depicting "Day 1," "Day 2," Day 3" respectively.

In another implementation, the process 400, at 420, determines information overlays for changes in relationship between the media content items. For example, when there is a change in location, an information overlay can be determined for the change in location. In another example, information overlays can be determined for the first time someone appears in a presentation. Then in the presentation when a person appears for the first time, an information overlay can be displayed over the media content item depicting the personal information of that person. When the person shows up in subsequent media content items, the information overlay would not appear.

At 430, the process 400 starts with media content item N=1. At 440, the process 400 determines whether the media content item N has metadata related to the information overlays for the presentation. If so, then the process obtains information corresponding to the information overlay at 445. The information can be obtained from a local or remote data source. For example, if one of the information overlays is news information, the process can obtain a news feeds from a remote news database based on the time metadata of a media content item. In another example, if one of the information overlays is personal identification information of a person portrayed in the media content item, the process 400 can generate the person's names and age for display based on the time metadata, name metadata and the person's birth date metadata associated with the media content item. In another example, the information overlays could include data from a remote data source indicating stock history information based on the time metadata of media content items related to a company's growth and background. In another example, the process may obtain information regarding the elapsed time between media content item N and N+1 based on the time metadata. In another example, the process can obtain statistical information regarding the people in the media content. If there is no metadata related to the information overlays for the presentation, information is not obtained for an information overlay.

At 450, the process 400 determines whether N=n. If not, N is advanced by 1 to the next media content item, and the process 400 goes through steps 440, 445, and 450 again. Once N=n, process moves on to displaying the presentation. At step 455, the process 400 starts with media content item N=1 again. At 460, process 400 determines whether media content item N has information overlay related information associated with it. Not all media content items need to have information overlay related information. For example, some content items may not have metadata that relate to the information overlays for the presentation. For media content items with no information overlay related information, the process 400 displays the media content item without a information overlay at 465. If there is information overlay related information, the process 400 displays the media content item with information overlays at 470.

The process can display the media content item for a preset time period before moving onto the next step. For a photograph for example, process 400 can display it for several seconds. For a video, the video can be displayed for the length of the video clip. Or, the presentation can display the media content item until receiving a prompt to move onto the next step.

At 475, the process 400 determines if N=n. If not, the process 400 moves on to the next media content item by advancing N by 1 at 480. The process 400 goes through the steps 460, 465, and 470 as described above. This repeats until N=n. When N=n, then all the media content items for the presentation have been displayed and the presentation stops, at 485. In another implementation, the presentation can continue again from N=1 until it receives a prompt to stop.

Figure 5:
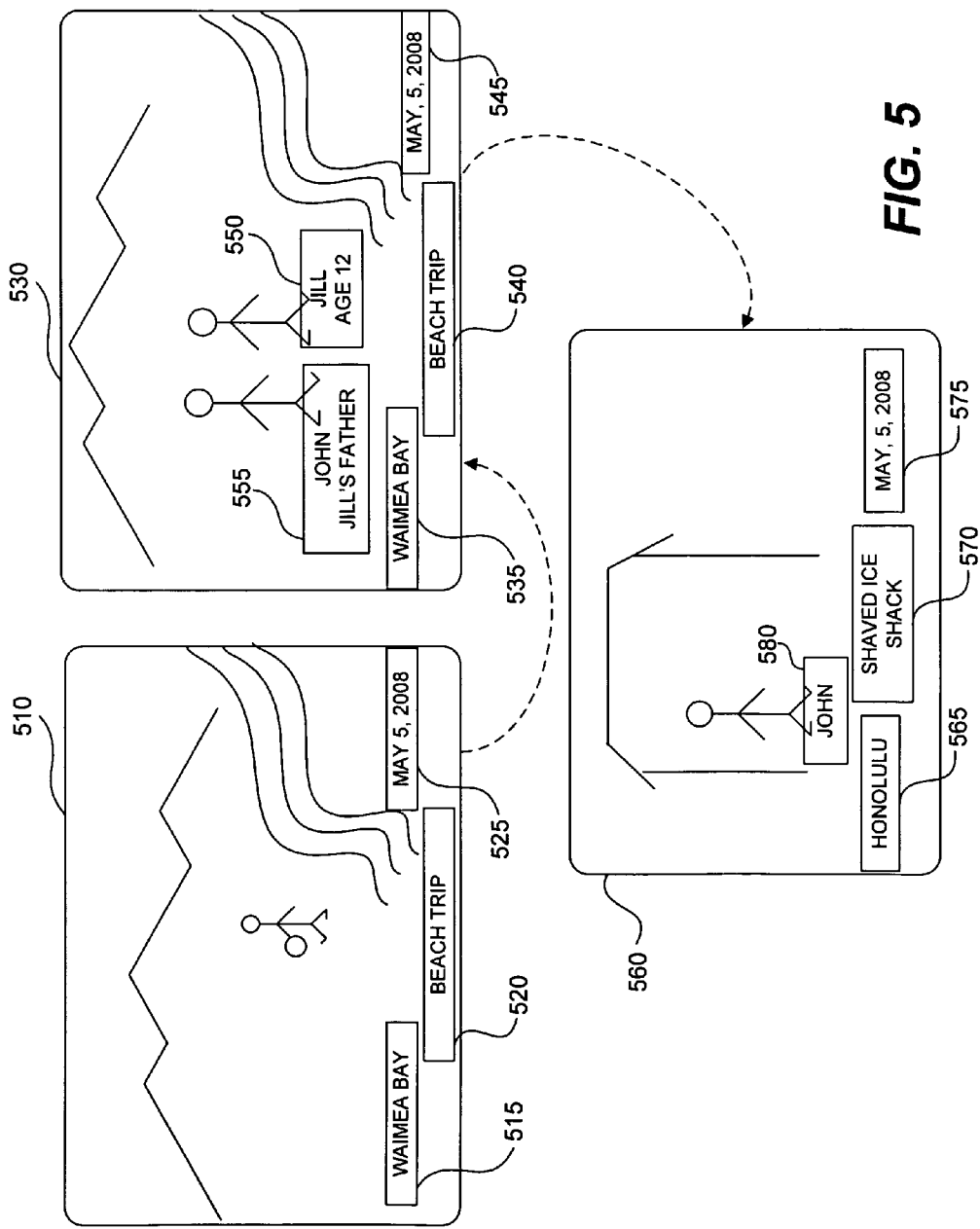
FIG. 5 is an example of a presentation having automated information overlays.

FIG. 5 is an example of a presentation 500 having automated information overlays. The presentation 500 displays information overlays for location, sub-event, personal identification, and date. In this example, these information overlays are displayed for media content items taken during a global event, such as a trip to Hawaii.

The video 510 is the first media content item displayed in the presentation. The video 510 can be, for example, a video clip taken at the beach during the trip to Hawaii. The video 510, for example, has time, location, and sub-event metadata. The information overlays 515, 520, and 525 are automatically generated and displayed over the video 510 while the video is being displayed. The information overlay 515 is a location information overlay displaying the location of the content of the media content item. The information overlay 520 is a sub-event information overlay. All media content items taken at the beach, for example, have sub-event metadata tag for "Beach Trip." The information overlay 525 is the date the media content item was created.

Once video 510 is finished being displayed, the next media content item in the presentation, a photograph 530, is displayed. The photograph 530 is a picture also taken at the beach during the Hawaii trip of a person named John and a person named Jill. The photograph 530 has time, location, sub-event, and personal identification metadata. The personal identification metadata can be generated by a face recognition program. As explained above, the automated system can then determine the age of the person based on the time metadata of the media content item and the birth date of the identified person. Relationships can also be obtained once the persons in the media content item have been identified.

The information overlays 535, 540, 545, 550 and 555 are automatically generated and displayed over the photograph 530 while the photograph 530 is being displayed. The information overlay 535 is a location information overlay displaying the location of the content of the photograph 530. The information overlay 540 is a sub-event information overlay depicting that the content of photograph 530 is a part of the sub-event "Beach Trip." The information overlay 545 is the date the media content item was created. The information overlays 550 and 555 are personal information overlays based on personal identification metadata. The information overlay 550 depicts the name and age of the person portrayed in the photo. In like manner, the information overlay 555 is a personal information overlay based on the metadata associated with John. In this example, the automated system has obtained John's relationship to Jill and displayed it as an information overlay.

Once photo 530 is finished being displayed, the next media content item in the presentation, photo 560, is displayed. In this example, photo 560 is a picture taken at a shaved ice shack in Honolulu during the Hawaii trip. As a result, the content information overlay 565 now shows the location as Honolulu. The information overlay 575 depicts the date the photograph was taken. The information overlay 570 depicts a new sub-event—Shaved Iced Shack. Also, the information overlay 580 is a personal information overlay that depicts the name of the person portrayed in the photograph 560.

In another implementation, the type of information overlays can change. For example, information overlay 575 can be a weather icon information overlay instead of a sub-event information overlay. In such an example, the automated system obtains weather information and displays that information as the information overlay 575. Other information overlays can include news feed information overlays or sound effect information overlays etc. In this example, music can automatically be downloaded and played based on the location, such as Hawaiian traditional music, ocean sound effects, etc. In one example, the type of music may indicate a change in the relationship between the media content items. For example, lively beach music can be overlaid for the beach sub-event whereas slower music may be played for other events such as a dinner. Or in another example, music may indicate a change in location. Hawaiian music may be overlaid for the media content items in Hawaii whereas if the trip included a media content items from a stop in Italy then Italian music may be overlaid.

Figure 6:
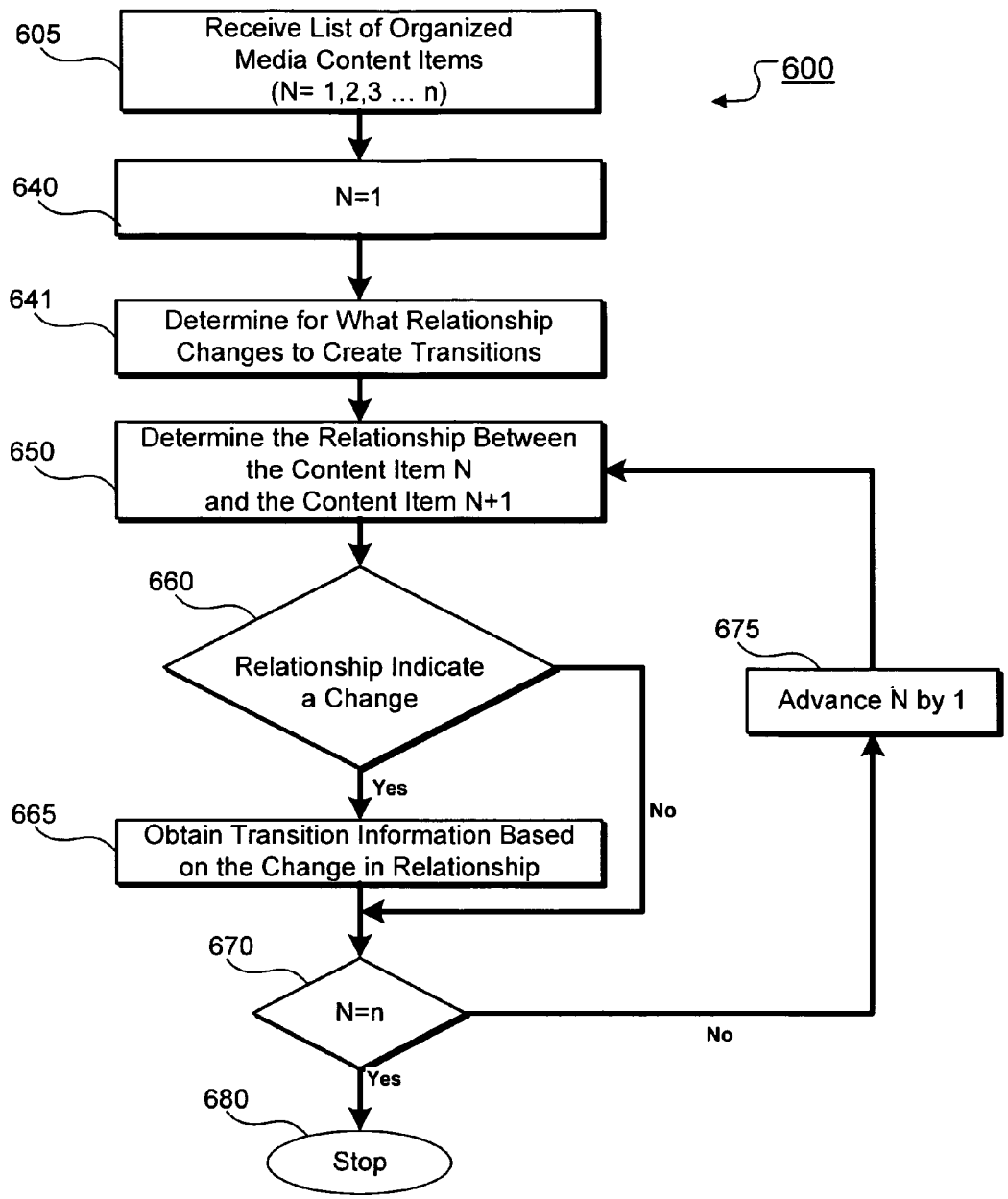
FIG. 6 is a flow chart illustrating a process for preparing a presentation with automated transitions.

FIG. 6 is a flow chart illustrating a process for preparing a presentation with automated transitions. At 605, the process 600 receives a list of organized media content items. The media content items can be organized according to process 300 as described in connection with FIG. 3, such as chronologically, by event, or by location. At 640, process 600 starts with N=1.

At 641, process 600 determines what changes in relationships of the media content items are sufficient for creating a transition. In one implementation, the process 600 determines relative changes in relationships for all of the media content items. For relatively significant changes in relationships, the process determines that a transition should be created. What is a significant change in relationship depends on what media content items are included in the presentation. For example, the process 600 at 641 can have preset instructions for determining if a change in location is significant enough for creating a transition. The media content items in a presentation may have multiple media content items taken at relatively separate locations, such as at a beach and at a hotel. Although the pictures at the beach are not all taken at exactly the same spot, with respect to the rest of the media content items the beach photos are taken at relatively the same location. In such an example, the process determines a transition is appropriate for the relative change in location—the beach to the hotel.

In another example, the process 600 determines that a transition is appropriate when there is a relatively large gap in time between the media content items. What is large and what is small depends on what is included in the presentation. For example, during a two day vacation a large gap may be on the order of several hours and a small time gap may be on the order of several minutes. On the other hand, in a presentation of an overview of a person's life, small gaps may be on the order of hours or even days whereas large gaps may be on the order of years.

In yet another example, the process 600 determines whether a transition is appropriate when there is a sufficient enough change in event or sub-event. At a birthday party for example, there may be multiple sub-events such as making cupcakes, piñata, birthday dinner, blowing out candles, and swimming. In the presentation, the media content items are displayed by group. A transition would be determined for when the presentation moves from one sub-event to another.

The process 600 can use any type of metadata or combination of metadata to determine if there is a sufficient enough change for a transition. For example, process 600 may look at both time and location to determine when a transition is appropriate. For example, the media content items taken on a beach within a five minute time frame may not be sufficient for a transition whereas a significant enough change may occur when media content item N is at a beach and media content item N+1 is 3 hours later at a hotel 30 miles away. In another example, the presentation may be of media content items of a multi-day event. If the media content items are ordered chronologically, the transitions may be day to day, such as "Day 1", "Day 2", "Day 3" etc.

In another example, the user may be prompted to determine what type of transitions to include in the presentation.

At 650, the process 600 determines the relationship between media content item N and the next content item N+1. The process 600 determines the change in metadata such as change time, location, event, people, etc. At 660, the process 600 determines if there is a sufficient change in relationship between the media content item N and N+1 for a transition. If the change in relationship indicates a sufficient change, the process 600 at 665 obtains transition information based on the change in relationship. For a sufficient change in location, for example, a map may be obtained depicting each location. Also, the amount of lapsed time can be determined. Or, information regarding the change in event can be obtained. Or, information regarding a change in weather can obtained.

At 670, process 600 determines if N=n. If not, the process 600 moves on to the next media content item by advancing N by 1 at 675. The process 600 goes through the steps 660, 665, and 670 as described above. This repeats until N=n. If N=n, process stops, at 680.

Figure 7:
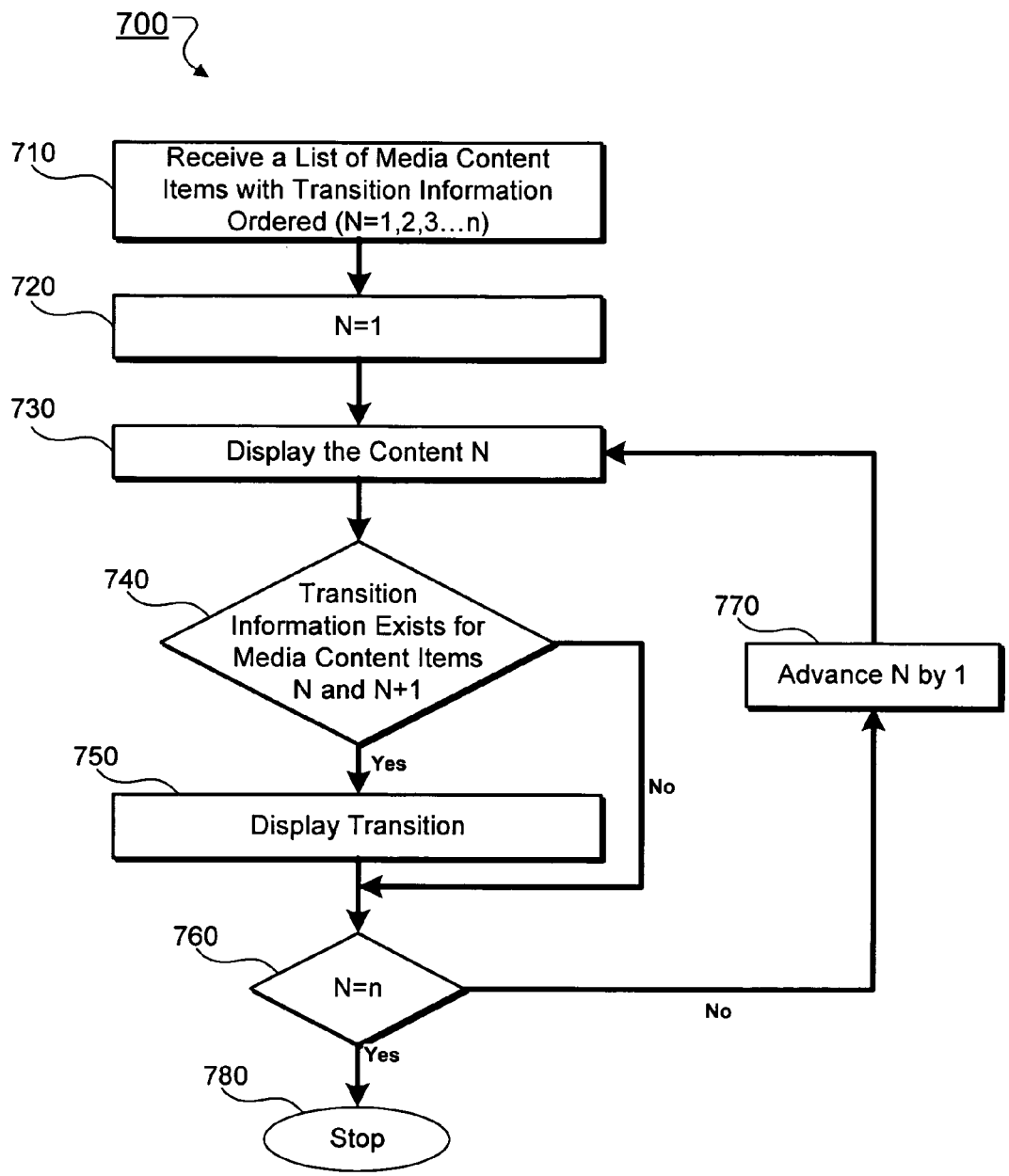
FIG. 7 is a flow chart illustrating a process for displaying a presentation with automated transitions.

FIG. 7 is a flow chart illustrating a process 700 for displaying a presentation with automated transitions. At 710, the process 700 receives a list of content items with transition information ordered (N=1, 2, 3 . . . n). This list can be obtained, for example, from process 600 as described in connection with FIG. 6. In another example, the list with transitions can be uploaded via an input device. At 720, the process 700 starts a presentation with N=1. At 730, the process 700 displays media content item 730. This media content item can be displayed for a preset period of time before moving onto the next step. For a photograph, for example, process 700 can display it for several seconds. For a video, the video can be displayed for the length of the video clip. Or, the presentation can display the media content item until receiving a prompt to move onto the next step.

At 740, the process 700 determines if transition information exists for a transition between media content items N and N+1. If there is no transition information, then the process moves on to step 760. If transition information exists, the process 700 automatically displays a transition with the transition information at 750. For example, the transition 750 may display transition information depicting a change in relationship between media content item N and N+1 based on the metadata, such as a change in location, change in time, change in weather, change in event etc. An example presentation with a display is discussed in connection with FIG. 8.

At 760, the process 700 determines if N=n. If not, the process 700 moves on to the next media content item by advancing N by 1 at 380. The process 700 goes through the steps 730, 740, 750, and 760 again as described above. This repeats until N=n. When N=n, then all the media content items for the presentation have been displayed and the presentation stops, at 785. In another example, the presentation can continue from the beginning until it receives a prompt to stop.

Figure 8:
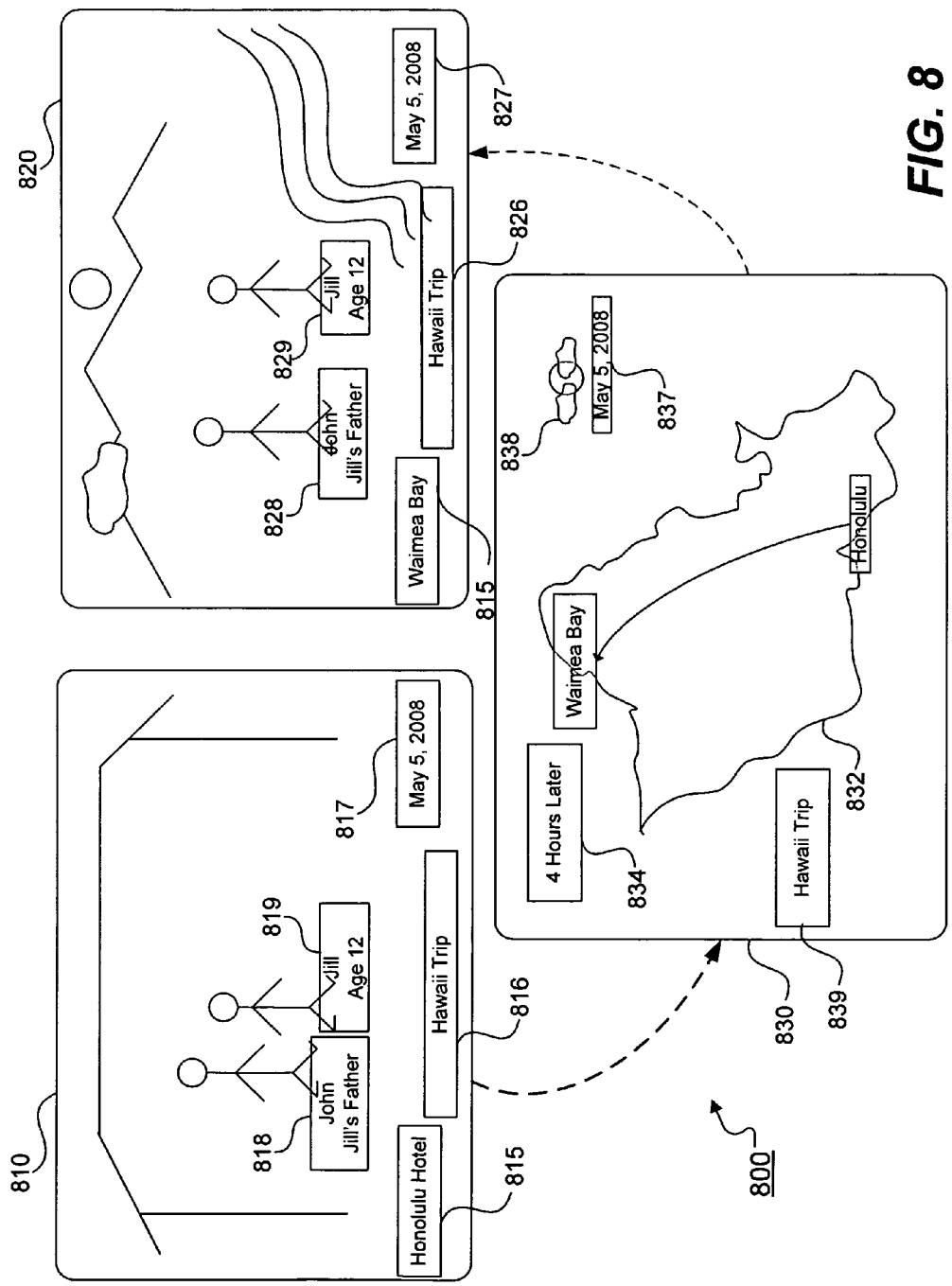
FIG. 8 is an example of a presentation having an automated transition.

FIG. 8 is an example of a presentation 800 having an automated transition and automated information overlays. Presentation displays information overlays for media content items 810 and 820 and for a transition 830. The information overlays are based on the metadata of the media content items and include location, global event, date, elapsed time, and person identification.

The photograph 810 is the first media content item displayed in the presentation. The photograph 810 is a picture of a girl and her father taken at a hotel in Honolulu. The photograph 810 has time, location, global event, and personal identification metadata associated with it. Based on this metadata, the information overlays are automatically generated. The information overlays include a location information overlay 815, a global event information overlay 816, a date information overlay 817, and personal identification information overlays 818 and 819. The information overlays are automatically displayed over the photograph 810 while the photograph is being displayed as part of the presentation.

After the photograph 810 is finished being displayed, a transition 830 is displayed before displaying the next media content item. The next media content item is a photograph 820 of a girl and her father at the beach. Like photograph 810, photograph 820 has time, location, global event, and personal identification metadata associated with it. The transition 830 is based on the change between photographs as determined by the associated metadata. In this transition, the transition has a map 832 of showing a change in location. The transition 830 also shows a change in time 834, a change in weather icon 838. The map 482 is a map of Hawaii indicating the change in location is from Honolulu to Waimea Bay. The change in time 834 shows that 4 hours elapsed between the content of the photograph 810 and the content of the photograph 820. The change in weather icon is a picture of partly cloudy skies indicating that the weather changed to partly cloudy skies. The transition 830 is a still frame transition that can be displayed for a preset period of time. In another example, the transition can be an automatically generate animation depicting the relationship change between the two media content items.

The transition can include information not related to a change. In this example, the transition display the date 837 and global event 839 even though there is no change in either the time or global event.

After the transition 830 is finished being displayed, the next media content item is displayed. In this example, it is a photograph 820 of the same girl and her father at Waimea Bay. Information overlays are automatically generated and displayed over photograph 820, including location, global event, date, and personal identification information overlays.

Various types of automated transitions are anticipated. For example, a transition can include manipulating the media content item itself, for example, when there is a significant change in media content item types. When the presentation transitions from video to a photograph, for example, the last frame of the video can be held and then cross-dissolved into a the photograph.

FIG. 9 is a schematic of an example of a system for implementing a presentation. FIG. 9 shows system 100 communicatively connected to a remote data source 222, a media content source 922 and a viewer site 928. The media content source 922 includes at least a data storage device with a communications network interface. For example, the media content source 922 can include a home computer, a server, hand held device, or the like. The viewer site 928 includes at least a communications interface and an output device, such as a display device. For example, the viewer site 928 can include a home computer, hand held device, or the like.

The media content source 222 provides media content items with metadata to the data processing apparatus 110 via communications network 910. The media management module stores the media content items in data storage device 120. The media management module processes the media content items for a presentation with automated information overlays and transitions. The media management module 150 obtains data for the transitions and information overlays from the remote data source 222 The presentation is displayed via communications network 910 to the viewer site 928. In one example, the viewer site 928 selects the content categories to be included in the presentation.

In another example, the media content source and the viewer sight are accessed by the same user. A user can upload media content items for a presentation and then view the presentation via viewer sight 928. In yet another example, a first user uploads media content items to the system 100, and a second user accesses and views the presentation via viewer site 928. In another example, a third-party user viewing the presentation via viewer site 928 can add metadata (e.g. comments and personal information etc.) to the media content items that can be used in future presentations.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a machine or computer readable medium. The machine or computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application. It will be understood that various modifications may be made without departing from the spirit and scope of the invention. Accordingly, other embodiments are within the scope of the following claims.

What is claimed is:

1. A computer-implemented method comprising:
   displaying a first media content item having associated metadata;
   determining a relationship, wherein the relationship comprises relative differences between the metadata associated with the first media content item and metadata associated with a second media content item;
   determining textual information depicting the relationship of relative differences between the metadata associated with the first media content item and metadata associated with a second media content item;
   after displaying the first media content item, displaying a transition media content item that includes the textual information; and
   displaying the second media content item.

2. The method of claim 1, further comprising determining transitions for a media presentation comprising three or more media content items based on a relationship between metadata associated with the three or more media content items.

3. The method of claim 1, further comprising organizing three or more media content items having associated metadata for a media presentation based on a relationship between the associated metadata.

4. The method of claim 1, wherein the information corresponding to the relationship is obtained from at least one remote data source.

5. The method of claim 1, wherein determining the relationship comprises performing facial recognition of a person portrayed in the first and second media content items.

6. The method of claim 1, wherein the first media content item and the second media content item are digital photographs displayed in a sequence with the transition media content item.

7. The method of claim 1, wherein determining the relationship comprises calculating a difference between metadata associated with the first media content item and metadata associated with the second media content item.

8. The method of claim 1,
wherein the first media content item's associated metadata comprises location information;
the second media content item's associated metadata comprises location information; and
the relationship comprises a change in location.

9. The method of claim 8, wherein the transition comprises displaying the change in location on a map.

10. The method of claim 1,
wherein the first media content item's associated metadata comprises time metadata;
the second media content item's associated metadata comprises time metadata; and
the relationship comprises a change in time.

11. The method of claim 10, wherein the transition comprises displaying the elapsed time between the time metadata of the first media content item and the time metadata of the second media content item.

12. The method of claim 1, wherein the transition further comprises displaying an animation.

13. The method of claim 1, wherein the transition further comprises displaying a change in event.

14. A computer program product, embodied on a non-transitory computer-readable medium, operable to cause a data processing apparatus to perform operations comprising:
displaying a first media content item having associated metadata;
determining a relationship, wherein the relationship comprises relative differences between the metadata associated with the first media content item and metadata associated with a second media content item;
determining textual information depicting the relationship of relative differences between the metadata associated with the first media content item and metadata associated with a second media content item;
after displaying the first media content item, displaying a transition media content item that includes the textual information; and
displaying the second media content item.

15. The computer program product of claim 14, further operable to cause a data processing apparatus to perform operations comprising determining transitions for a media presentation comprising three or more media content items based on a relationship between metadata associated with the three or more media content items.

16. The computer program product of claim 14, further operable to cause a data processing apparatus to perform operations comprising organizing three or more media content items having associated metadata in a media presentation based on a relationship between the associated metadata.

17. The computer program product of claim 14, wherein the information corresponding to the relationship is obtained from at least one remote data source.

18. The computer program product of claim 14, wherein determining the relationship comprises performing facial recognition of a person portrayed in the first and second media content items.

19. The computer program product of claim 14, wherein the first media content item and the second media content item are digital photographs displayed in a sequence with the transition media content item.

20. The computer program product of claim 14, wherein the determining the relationship comprises calculating a difference between metadata associated with the first media content item and metadata associated with the second media content item.

21. The computer program product of claim 14, wherein the transition comprises displaying a change in location on a map.

22. The computer program product of claim 14, wherein the transition comprises displaying the elapsed time between time metadata associated with the first media content item and time metadata associated the second media content item.

23. The computer program product of claim 14, wherein the transition further comprises displaying an animation.

24. The computer program product of claim 14, wherein the transition further comprises displaying a change in event.

25. A system comprising:
a processor; and
a computer-readable medium encoding a computer program product to cause the processor to perform operations comprising:
displaying a first media content item having associated metadata;
determining a relationship, wherein the relationship comprises relative differences between the metadata associated with the first media content item and metadata associated with a second media content item;
determining textual information depicting the relationship of relative differences between the metadata associated with the first media content item and metadata associated with a second media content item;
after displaying the first media content item, displaying a transition media content item that includes the textual information; and
displaying the second media content item.

26. The system of claim 25, the operations further comprising determining transitions for a media presentation comprising three or more media content items based on a relationship between metadata associated with the three or more media content items.

27. The system of claim 25, the operations further comprising organizing three or more media content items having associated metadata in a media presentation based on a relationship between the associated metadata.

28. The system of claim 25, wherein the information corresponding to the relationship is obtained from at least one remote data source.

29. The system of claim 25, wherein determining the relationship information comprises performing facial recognition of a person portrayed in the first and second media content items.

30. The system of claim 25, wherein the first media content item and the second media content item are digital photographs displayed in a sequence with the transition media content item.

31. The system of claim 25, wherein the determining the relationship comprises calculating a difference between metadata associated with the first media content item and metadata associated with the second media content item.

32. The system of claim 25,
wherein the first media content item's associated metadata comprises location information;
the second media content item's associated metadata comprises location information; and
the relationship comprises a change in location.

33. The system of claim 32, wherein the transition comprises displaying the change in location on a map.

34. The system of claim 32,
wherein the first media content item's associated metadata comprises time metadata;
the second media content item's associated metadata comprises time metadata; and
the relationship comprises a change in time.

35. The system of claim 34, wherein the transition comprises displaying the elapsed time between the time metadata of the first media content item and the time metadata of the second media content item.

36. The system of claim 25, wherein the transition further comprises displaying an animation.

37. The system of claim 25, wherein the transition further comprises displaying a change in event.

38. A computer-implemented method comprising:
obtaining a first and a second media content item, the first and second media content items each having associated metadata;
obtaining information corresponding to the associated metadata for the first and second media content items;
determining a relationship, wherein the relationship comprises relative differences between the metadata associated with the first media content item and metadata associated with the second media content item;
determining textual information depicting the relationship of relative differences between the associated metadata for the first and second media content items;
displaying the first media content item and the obtained information corresponding to the first media content item's associated metadata;
after displaying the first media content item, displaying a transition media content item that includes the textual information; and
displaying the second media content item and the obtained information corresponding to the second media content item's associated metadata.

39. The method of claim 38, further comprising determining information to be displayed in the transition media content item based on relationships between metadata associated with three or more media content items.

40. The method of claim 38, further comprising organizing three or more media content items having associated metadata for a media presentation based on a relationship between the associated metadata.

41. The method of claim 38, wherein the obtaining the information comprises obtaining information from at least one remote data source.

42. The method of claim 38, wherein the obtaining the information comprises performing facial recognition of a person portrayed in at least one of the first or second media content items.

43. The method of claim 38, wherein the information comprises news information.

44. The method of claim 38, wherein the information comprises sound.

45. The method of claim 38, wherein the information comprises personal identification information of a person portrayed in at least one of the first or second media content items.

46. The method of claim 45, wherein the information compromises familial relationship of a person portrayed in at least one of the first or second media content items with another person.

47. The method of claim 38, wherein the metadata comprises event metadata.

48. The method of claim 38, wherein the metadata comprises topical metadata.

49. The method of claim 38, wherein the metadata comprises time metadata.

50. The method of claim 38, wherein the metadata comprises location metadata.

51. The method of claim 38, further comprising displaying the transition media content item after the first media content items and before the second media content item.

52. A computer program product, embodied on a non-transitory computer-readable medium, operable to cause a data processing apparatus to perform operations comprising:
obtaining a first and a second media content item, the first and second media content items each having associated metadata;
obtaining information corresponding to the associated metadata for the first and second media content items;
determining a relationship, wherein the relationship comprises relative differences between the metadata associated with the first media content item and metadata associated with the second media content item;
determining textual information depicting the relationship of relative differences between the associated metadata for the first and second media content items;
displaying the first media content item and the obtained information corresponding to the first media content item's associated metadata;
after displaying the first media content item, displaying a transition media content item that includes the textual information; and
displaying the second media content item and the obtained information corresponding to the second media content item's associated metadata.

53. The computer program product of claim 52, further operable to cause a data processing apparatus to perform operations comprising determining information to be displayed in the transition media content item based on relationships between metadata associated with three or more media content items.

54. The computer program product of claim 52, further operable to cause a data processing apparatus to perform operations comprising organizing three or more media content items having associated metadata for a media presentation based on a relationship between the associated metadata.

55. The computer program product of claim 52, wherein the obtaining the information comprises obtaining information from at least one remote data source.

56. The computer program product of claim 52, wherein the obtaining the information comprises performing facial recognition of a person portrayed in at least one of the first or second media content items.

57. The computer program product of claim 52, wherein the information comprises news information.

58. The computer program product of claim 52, wherein the information comprises sound.

59. The computer program product of claim 52, wherein the information comprises personal identification information of a person portrayed in at least one of the first or second media content items.

60. The computer program product of claim 52, wherein the metadata comprises event metadata.

61. The computer program product of claim 52, wherein the metadata comprises topical metadata.

62. The computer program product of claim 52, wherein the metadata comprises time metadata.

63. The computer program product of claim 52, wherein the metadata comprises location metadata.

64. A system comprising:
a processor;
and a computer-readable medium encoding a computer program product to cause the processor to perform operations comprising:
obtaining a first and a second media content item, the first and second media content items each having associated metadata;
obtaining information corresponding to the associated metadata for the first and second media content items;
determining a relationship, wherein the relationship comprises relative differences between the metadata associated with the first media content item and metadata associated with the second media content;
determining textual information depicting the relationship of relative differences between the associated metadata for the first and second media content items;
displaying the first media content item and the obtained information corresponding to the first media content item's associated metadata;
after displaying the first media content item, displaying a transition media content item that includes the textual information; and
displaying the second media content item and the obtained information corresponding to the second media content item's associated metadata.

65. The system of claim 64, the operations further comprising determining information to be displayed in the transition media content item based on relationships between metadata associated with three or more media content items.

66. The system of claim 64, further comprising organizing three or more media content items having associated metadata for a media presentation based on a relationship between the associated metadata.

67. The system of claim 64, wherein the obtaining the information comprises obtaining information from at least one remote data source.

68. The system of claim 64, wherein the obtaining the information comprises performing facial recognition of a person portrayed in at least one of the first or second media content items.

69. The system of claim 64, wherein the information comprises news information.

70. The system of claim 64, wherein the information comprises sound.

71. The system of claim 64, wherein the information comprises personal identification information of a person portrayed in at least one of the first or second media content items.

72. The system of claim 64, wherein the metadata comprises event metadata.

73. The system of claim 64, wherein the metadata comprises topical metadata.

74. The system of claim 64, wherein the metadata comprises time metadata.

75. The system of claim 64, wherein the metadata comprises location metadata.

* * * * *

UNITED STATES PATENT AND TRADEMARK OFFICE
CERTIFICATE OF CORRECTION

PATENT NO. : 8,689,103 B2
APPLICATION NO. : 12/118602
DATED : April 1, 2014
INVENTOR(S) : Lindley et al.

Page 1 of 1

It is certified that error appears in the above-identified patent and that said Letters Patent is hereby corrected as shown below:

In the Claims

Column 19, line 9, Claim 34, delete "32" and insert --25--, therefor

Column 21, line 8-9, Claim 64, delete "processor;¶ and" and insert --processor; and¶--, therefor Column 21, line 20, Claim 64, delete "content;" and insert --content item;--, therefor Signed and Sealed this
Fourth Day of November, 2014

Michelle K. Lee
*Deputy Director of the United States Patent and Trademark Office*